United States Patent [19]
Purdham et al.

[11] Patent Number: 5,434,871
[45] Date of Patent: Jul. 18, 1995

[54] CONTINUOUS EMBEDDED PARITY CHECKING FOR ERROR DETECTION IN MEMORY STRUCTURES

[75] Inventors: David M. Purdham, Brooklyn Park; David C. Johnson, Roseville, both of Minn.

[73] Assignee: Unisys Corporation, Blue Bell, Pa.

[21] Appl. No.: 978,093

[22] Filed: Nov. 17, 1992

[51] Int. Cl.⁶ .................................................. G06F 11/10
[52] U.S. Cl. .................................. 371/51.1; 371/49.2
[58] Field of Search ............... 371/51.1, 40.1, 49.1, 371/49.4, 49.2

[56] References Cited

U.S. PATENT DOCUMENTS

| | | | |
|---|---|---|---|
| 3,567,916 | 3/1971 | Fullton | 371/49.4 |
| 3,887,901 | 6/1975 | Moore, III | 340/146.1 AG |
| 3,911,261 | 10/1975 | Taylor | 371/49.4 |
| 3,961,747 | 6/1976 | Small et al. | 235/61.9 R |
| 3,982,111 | 9/1976 | Lerner et al. | 371/21.1 |
| 4,016,409 | 4/1977 | Kim | 340/140.1 AG |
| 4,074,229 | 2/1978 | Prey | 371/51.1 |
| 4,688,219 | 8/1987 | Takemae | 371/10 |
| 4,768,193 | 8/1988 | Takemae | 371/10 |
| 4,896,323 | 1/1990 | Körner et al. | 371/49.4 |
| 5,003,542 | 3/1991 | Mashiko et al. | 371/40.1 |
| 5,140,597 | 8/1992 | Araki | 371/51.1 |
| 5,241,547 | 8/1993 | Kim | 371/49.4 |

OTHER PUBLICATIONS

"A Defect and Fault Tolerant Design of WSI Static RAM Modules" Tsuda, 1990 IEEE pp. 213-219.
"A Built in Hamming Code ECC Circuit for DRAM's" For Utani et al IEEE Journl of Solid State Circuits, vol. 24 No. 1 Feb. 1990.
Clinton Kuo et al., Soft-Defect Detection (SDD) Technique for a High-Reliability CMOS SRAM, IEEE Journal of Solid-state Circuits, vol. 25, No. 1, Feb., 1990.

Primary Examiner—Robert W. Beausoliel, Jr.
Assistant Examiner—Joseph E. Palys
Attorney, Agent, or Firm—Nawrocki, Rooney & Sivertson

[57] ABSTRACT

A method of and apparatus for continuous parity checking within a CMOS SRAM memory system. Each cell has added circuitry which permits continuous reading of the binary state of the cell. The states of each cell are combined to produce a parity determination for a given data array. By continuously monitoring parity in this manner, the time of failure as well as the fact of failure can be determined.

7 Claims, 3 Drawing Sheets

CONTINUOUS EMBEDDED PARITY CHECKING FOR ERROR DETECTION IN MEMORY STRUCTURES

CROSS REFERENCE TO APPLICATIONS

U.S. patent application Ser. No. 07/978,128, filed Nov. 18, 1992 entitled "CMOS STATIC RAM TESTABILITY", now U.S. Pat. No. 5,361,232 issued Nov. 1, 1994 is commonly assigned and is incorporated herein by reference.

BACKGROUND OF THE INVENTION

1. Field of the Invention

The present invention generally relates to memory storage subsystems and more particularly relates to error detection techniques for digital memory.

2. Description of the Prior Art

The earliest large capacity memories for digital computers were electromechanical devices, such as magnetic storage drums. Because these were not truly random access devices and the average access time was so large, these were readily replaced with static magnetic memories. The most popular of these utilized small magnetic cores wherein each data bit was stored in the magnetic polarization of a different one of a large array of magnetic cores.

Magnetic memories have in large measure been replaced by monolithic semiconductors employing digital electronic circuits which store the data. In its simplest form, each data bit is stored in a different one of a large array of separate bistable circuits. Because accesses to semiconductor memories are completely electronic, they tend to have a very favorable cycle time when compared with magnetic memories. Historically, the major disadvantage of semiconductor memories was cost. However, current semiconductor fabrication technologies have made semiconductor memories extremely cost competitive.

Bipolar semiconductors provide the fastest memory devices. However, the much lower power dissipation of metal oxide semiconductors (i.e. MOS) has tended to make them the preferred choice for most general applications. The MOS technology requiring the least quiescent power (i.e. power required to maintain a static state when not switching) is complementary symmetry MOS (i.e. CMOS). This power saving becomes most prominent for large scale memories, as they tend to have a relatively larger number of cells in a quiescent state at any given time.

Currently, an extremely popular semiconductor memory architecture is the CMOS Static Random Access Memory (i.e. SRAM). The CMOS SRAM employs a complementary semiconductor pair as the basic storage element. In four transistor (i.e. 4T) CMOS SRAM cells, resistors are used to pull up the transistors of the bistable to the current source. The somewhat newer 6T cells employ two transistors rather than two resistors to provide the pull up function. A primary advantage of the 6T cells is that it is easier to fabricate pull up transistors than pull up resistors in a high density environment, particularly if random logic fabrication is also required.

All memory systems require two basic types of testing. The first such test type is functional. This is accomplished by writing known data into the memory and subsequently reading from the memory to see that the stored data is as expected. For most prior art memory systems, such testing is virtually the same. This is the case, because the memory function tends to be the same without regard to the actual storage technology.

The second test type is tailored to the specific memory technology employed. These tailored tests are needed because the failure modes of the different memory technologies are different. Kuo et al. discuss a tailored test methodology for 6T CMOS SRAM cells in "Soft-Defect Detection (SDD) Technique for a High-Reliability CMOS SRAM" IEEE Journal of Solid-State Circuits, Volume 25, No. 1, February 1990.

A primary disadvantage of most of these prior art testing techniques is that they preclude other system uses of the memory during the testing process. This results in an effective reduction in memory availability or memory bandwidth. This is particularly true in the Kuo et al. approach which performs circuit testing on each cell. Though various software and system techniques have been attempted which minimize this negative impact, the basic problem continues to exist.

An alternative and/or adjunct to memory testing is error correction. This approach does not impede memory availability or bandwidth, because it does not act until a failure has actually occurred. Perhaps the most prominent and most expensive error correction technique involves voting. In this approach, complete redundancy is employed to permit error detection at the time of memory access. Multiple redundant storage elements are employed to permit data recovery for high reliability applications. As with error correction techniques generally, voting does not test the memory for suitability of future use but rather attempts to mitigate the negative effects of a failure which has already occurred.

SUMMARY OF THE INVENTION

The present invention overcomes the disadvantages of the prior art by providing an apparatus and method for advance testing of a memory storage system without a corresponding negative impact on the availability or effective bandwidth of the memory system. Yet the testing occurs in advance of the criticality of failure detection.

The test involves longitudinal and/or lateral parity checking of a memory system directly from the storage cells themselves rather than from the access ports. Thus the testing does not need to perform a read, write, or other normal memory function. Therefore, it can operate in parallel with normal, full capacity memory utilization. By employing the memory testing on a continuous basis, the technique can reveal the time of failure, as well as the fact of failure. Such timing information is important in environmental and high performance stress testing.

The preferred mode of the present invention is used in a 6T CMOS SRAM configuration. Six transistors are added to each 6T cell. Two of these transistors are used to "read" the opposing states of the bistable and to exclusive-or the parity with the parity from the previous cells, and the remaining four transistors provide the resulting parity signal and its complement to the next adjacent cell.

By employing the present invention both longitudinally and laterally, single bit errors can be both isolated and corrected. However, longitudinally parity checking requires the maintenance and updating of longitudinal parity for all write operations. This function is easily provided using a longitudinal parity register placed in parallel with the write data register of the memory system.

The time of failure can be determined because of the continuous nature of the testing. The only time that the testing must be disabled is during memory write functions. For a short period during memory writes, individual cells may be in an indeterminate state until the function is completed and the circuit transients have been completely damped. This indeterminate period is experienced for both lateral and longitudinal parity checking.

In the preferred embodiment of the present invention, most of the additional hardware (i.e. the six additional transistors) is added to each cell. This promotes ease of fabrication, although the individual storage cells become somewhat more complex. However, because implementation is so regular, very little additional hardware is needed at the memory system level.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
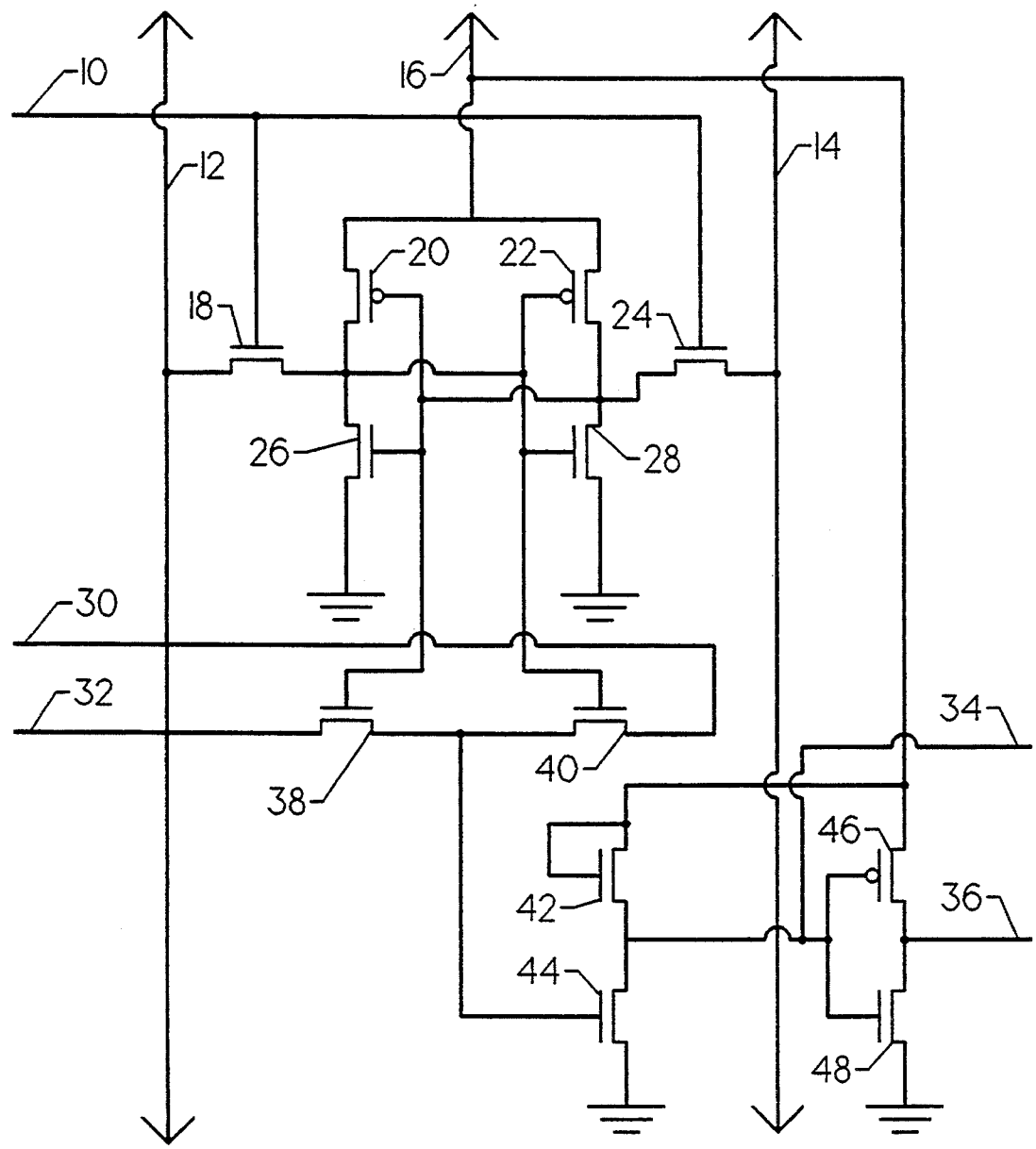
FIG. 1 is an electrical schematic diagram of a single 6T cell modified to practice the preferred mode of the present invention.

FIG. 1 is an electrical schematic diagram of a single 6T CMOS SRAM cell modified in accordance with the present invention. The prior art portion of the 6T cell comprises transistors 18, 20, 22, 24, 26, and 28, along with related interconnection circuitry.

Lines 12 and 14 are the bit line and complementary bit line, respectively. These lines couple to all of the individual cells within the memory system which are located at the same bit position as the cell shown. To enhance performance, lines 12 and 14 would ordinarily be precharged by a separate circuit (not shown). During write operations, lines 12 and 14 source and sink (or sink and source) current as an indication of the desired state of the bit to be written into the addressed cell. For read operations, the cell sources and sinks (or sinks and sources) current from lines 12 and 14 to indicate the state of the bit stored within the cell.

Addressing is provided by word line 10, which gates the addressed cell onto lines 12 and 14 via transistors 18 and 24. Thus a signal on line 10 indicates that the cell shown, along with all other cells within the same parallel data set (i.e. byte, word, etc.), are to be read from or written into. The addressing signal is generated using known circuitry by decoding the user access request. Because only one cell per column can be addressed, lines 12 and 14 are coupled to but one cell at a time.

Storage of a data bit within the cell is accomplished by setting the states of bistable transistors 26 and 28 and complementary transistors 20 and 22. This stored bit may then be read by examining the states of bistable transistors 26 and 28, along with complementary transistors 20 and 22. The complementary transistor pair 20 and 26 provides a path between current source 16 and ground. Transistors 22 and 28 provide a similar, parallel path. However, because transistors 20 and 26 and transistors 22 and 28 assume complementary states, the total quiescent current of the cell is only that associated with normal leakage. Because bistable transistors 26 and 28 and complementary bistable transistors 20 and 22 assume opposite states, the state of transistors 26 and 22 is the same, and the state of transistors 20 and 28 is the same.

In accordance with the preferred mode of the present invention and not to be deemed limiting of the scope of the invention, lines 30 and 32 couple laterally to other cells within the array. In the illustration, lines 30 and 32 run parallel with word line 10, indicating that lines 30 and 32 contain lateral parity information (i.e. parity of a single addressed parallel data element). Lines 30 and 32 could be run parallel to bit lines 12 and 14 to provide longitudinal parity (i.e. parity of all cells at a given bit position). Because the hardware, connections, and method of operation are similar, only lateral parity is shown for simplicity. However, correction of a single bit error requires both lateral and longitudinal parity. Lines 30 and 32 indicate the computed parity and complement of parity for all cells to the left of the illustrated cell.

In implementing longitudinal parity, a separate parity storage cell is required. For simplicity and speed of operation, it is anticipated that this would involve a parity register located near and parallel with the write data register of the memory system. If a write operation takes place, this parity register is updated from the write data register during the write operation and is easily read for longitudinal parity checking.

Transistors 38 and 40 exclusively-or the state of the illustrated cell with the computed parity of the cells to the left as represented on lines 30 and 32. Using the state of lines 30 and 32, along with the state of the cell, transistors 38, and 40 produce a combined parity value. This computed parity value is driven by transistors 42, 44, 46, and 48 via complementary lines 34 and 36 for input to the parity circuitry of the cell to the immediate right. By coupling the parity output of one cell (i.e. lines 34 and 36) to the parity input (i.e. lines 30 and 32) of the next cell, all cells within the memory array are coupled to provide continuous lateral parity. Continuous longitudinal parity can be similarly provided.

Figure 2:
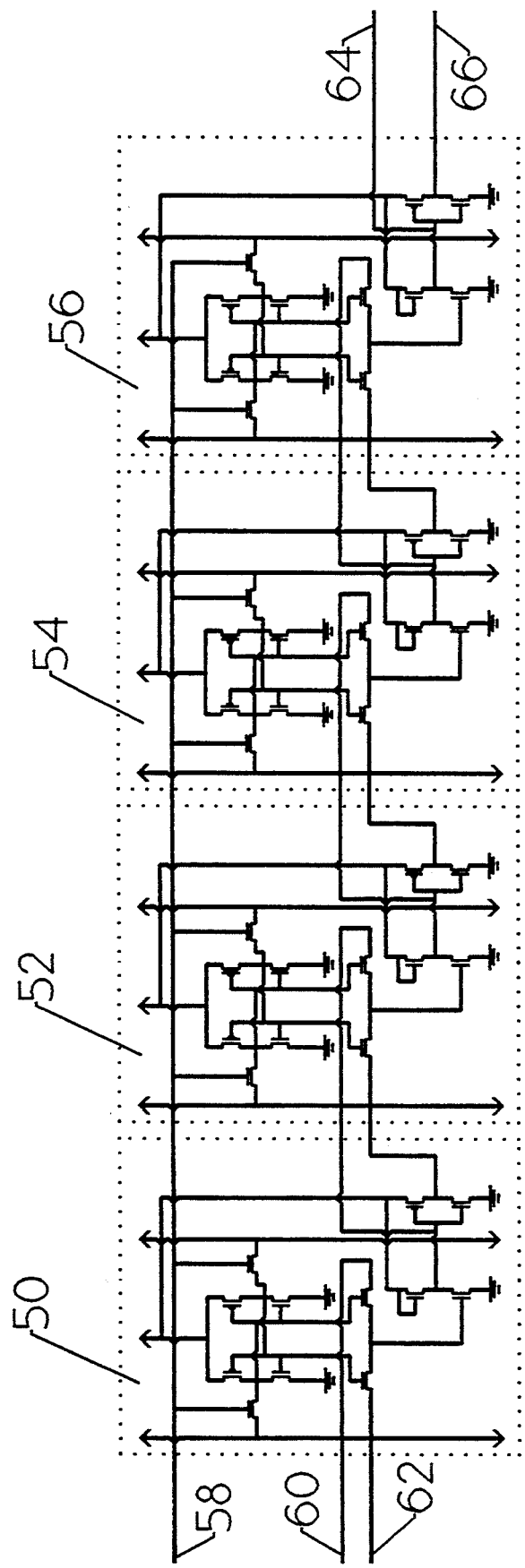
FIG. 2 is an electrical schematic diagram of multiple cells employing the present invention laterally.

FIG. 2 is an electrical schematic diagram of a four cell array employing continuous lateral parity in accordance with the preferred mode of the present invention. The four cells shown are all addressed by word line 58 providing a four-bit parallel data structure often termed "nibble". Cell 50, cell 52, cell 54, and cell 56 comprise the four cell array.

If cell 50 represents the least significant bit position, lines 60 and 62 are tied to ground and VCC to provide a starting parity value of zero. However, lines 60 and 62 may be coupled to yet other cells within the array. Similarly, lines 64 and 66 may couple to additional cells. If cell 56 is the most significant bit position within the array, lines 64 and 66 couple to the parity sensing circuitry. For simplicity, it is assumed that odd parity is generated and stored along with the stored data. This means that one additional bit position is required for each addressable parallel data set. As this is now so common in commercial use, separate parity generation and storage circuitry is not shown. However, for applications wherein odd parity is not generated by the memory user or access port circuitry, separate circuitry must be added to generate and store the odd parity bit.

Figure 3:
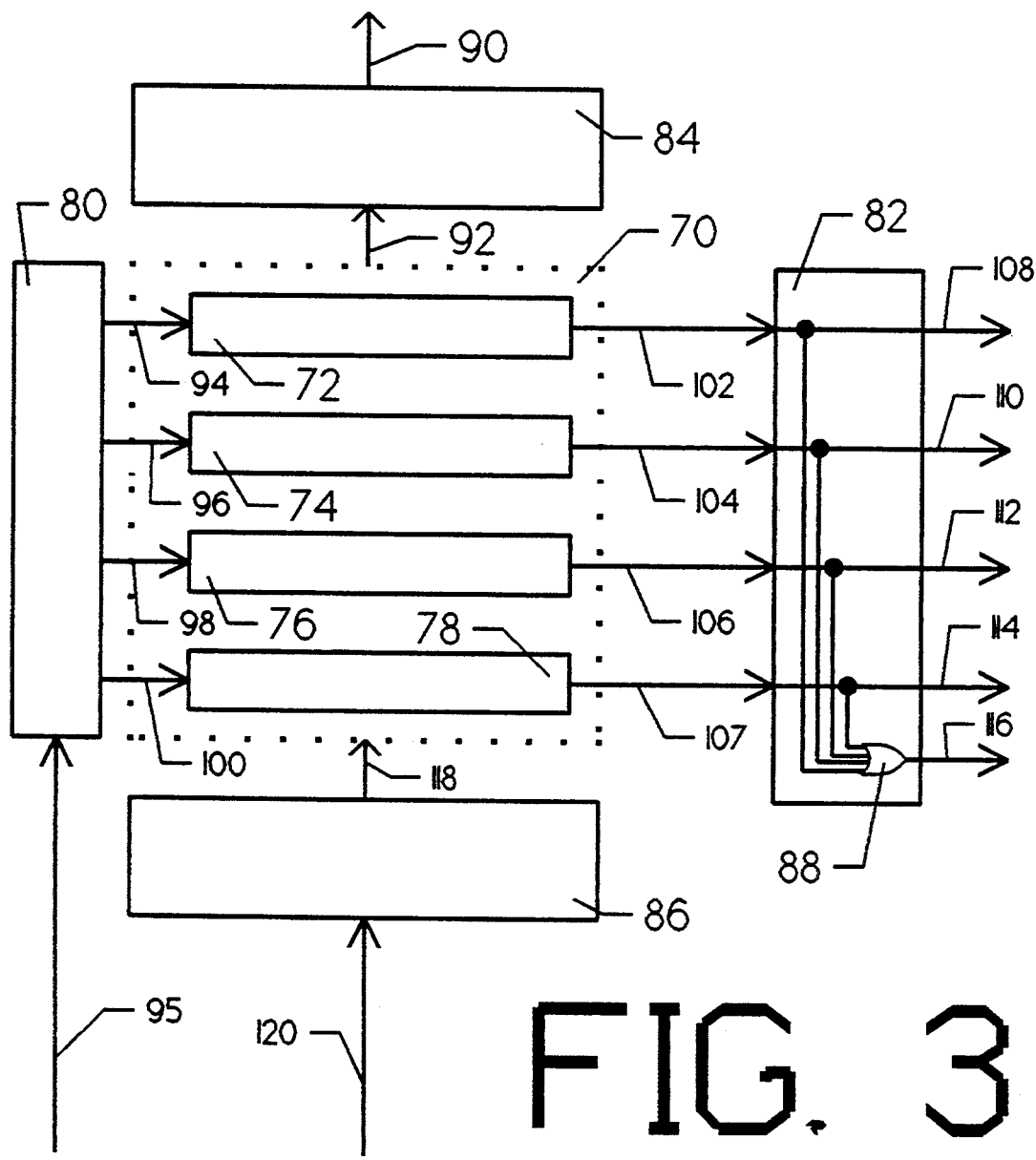
FIG. 3 is a basic block diagram of a multiword memory system.

FIG. 3 is a block diagram of a four word memory array. Only lateral parity is employed for simplicity. The user supplies an address via address input 95. Address decoder 80 decodes this address into an enable on one of word lines 94, 96, 98, or 100. In the present example, address line 95 would contain a two bit value wherein 00 is decoded as an enable on line 94, 01 results in an enable on line 96, 10 produces an enable on line 98, and 11 is decoded to produce an enable on line 100. Each of these word lines is similar to word line 10 (see also FIG. 1) and word line 58 (see also FIG. 2).

Memory array 70 consists of words 72, 74, 76, and 78, wherein each word comprises a number of individual cells coupled as shown in FIG. 2. The individual cells of the addressed one of words 72, 74, 76, and 78 are coupled to the bit lines for each bit position. For memory write functions, the parallel data is transferred via line 120 to write data buffer 86, from which it is applied to the bit and complementary bit lines (see also FIG. 1) via write interface 118. Similarly, read functions couple the addressed cells to the bit and complementary bit lines for transfer of the data to read data buffer 84 via read interface 92. The read data is provided to the user via read data output 90.

Lateral parity is continuously checked in accordance with the present invention (see also FIG. 2) for each of words 72, 74, 76, and 78. Line 102 reports a parity error in word 72. Similarly, lines 104, 106, and 107 report parity errors of words 74, 76, and 78, respectively. All parity error reports are received by error output circuit 82, which can time tag parity error reports and/or provide error correction using longitudinal parity circuitry (not shown). Error output circuit 82 also provides the means to disable parity error reports during write transients. Most simply implemented, this function merely requires that parity errors be present for a minimum period of time before being assumed to represent an actual failure. This is easily provided by a multivibrator circuit.

Lines 108, 110, 112, and 114 provide system level reports of the detected parity error. Or-gate 88 provides and indication of an error in memory array 70 via line 116. As can be readily seen by those of skill in the art, the present invention may be utilized for continuous checking of lateral parity, longitudinal parity, and both. A single parity check provides single bit error detection, whereas combining both parity checks provides single bit error correction with multiple bit error detection.

Having thus described the preferred mode of the present invention, those of skill in the art will be capable of applying the teachings found herein to yet other embodiments within the scope of the claims hereto attached.

We claim:
1. An apparatus comprising:
  a. a plurality of memory cells wherein each of said plurality of memory cells stores a state; and
  b. a plurality of parity generation circuits wherein each of said plurality of parity generation circuits is coupled to a corresponding one of said plurality of memory cells; each of the plurality of parity generation circuits continuously reads the state of the corresponding memory cell, continuously performs an exclusive-or of the state of the corresponding memory cell with a parity value provided by another of the plurality of parity generation circuits, and continuously provides a parity value to a yet another of the plurality of parity generation circuits.

2. An apparatus according to claim 1, wherein said plurality of cells comprises a plurality of semiconductor cells.

3. An apparatus according to claim 2 wherein said plurality of semiconductor cells comprises a plurality of CMOS cells.

4. An apparatus according to claim 3 wherein said plurality of CMOS cells comprises a plurality of SRAM cells.

5. An apparatus according to claim 4 wherein said plurality of SRAM cells comprises a plurality of 4T cells.

6. An apparatus according to claim 4 wherein said plurality of SRAM cells comprises a plurality of 6T cells.

7. An apparatus according to claim 1 wherein the plurality of memory cells are placed in rows and columns such that each of plurality of memory cells has an adjacent memory cell.

* * * * *